United States Patent Office 3,231,363
Patented Jan. 25, 1966

3,231,363
PROCESS FOR MAKING FOAMED UREA-FORMALDEHYDE FERTILIZER
Victor A. Renner, Marysville, Ohio, assignor to O. M. Scott and Sons Co., Marysville, Ohio, a corporation of Ohio
No Drawing. Filed Apr. 8, 1963, Ser. No. 271,465
10 Claims. (Cl. 71—29)

This invention relates to fertilizers, and, particularly, to a novel process and novel fertilizer products which constitute improvements over the process and products disclosed in my U.S. Patent 3,076,700.

In fertilizing lawn turf, it is necessary to supply a high level of nitrogen throughout the turf growing season to maintain growth and color, and a satisfactory turf fertilizer must therefore be composed of ingredients capable of providing the desired nitrogen level over a relatively long period of time. Some fertilizers have caused "burn" or plasmolysis due to the deleterious effects to plant leaves of excessive quantities of inorganic salts such as ammonium sulfate or nitrate, calcium phosphate, chloride or sulfate of potash present in relatively high proportion in these fertilizers.

Another problem in turf fertilization is that of physical application. With many fertilizers, conventional application to the plants has resulted in uneven distribution resulting in different turf response ranging from "burn" to no fertilization. This uneven distribution is caused by variations in the flowability, agglomeration and particle size of the fertilizer. These variations are minimized in the present invention.

My U.S. Patent 3,076,700 discloses highly effective "non-burning" fertilizers which avoid the foregoing problems. These fertilizers possess a relatively high nitrogen availability index and exhibit excellent physical properties enabling quick and easy distribution. In general, as disclosed in said patent, production of such products is achieved by producing a condensation product of urea and formaldehyde, either alone or in combination with other fertilizing ingredients, dispersed in the void spaces of a lightweight, porous carrier material such as expanded vermiculite. The materials impregnated into the carrier pores and covered by the condensation product are slowly released over extended periods preventing turf damage and promoting growth by obtaining optimum benefits of the fertilizing constituents. The condensation product is produced to provide nitrogen in a slowly soluble form, the nitrogen being present in a concentration sufficient to enable the use of the product as a source of nitrogen for a high nitrogen analysis fertilizer mixture.

In accordance with my present invention the advantages of my prior compositions (i.e., high level of nitrogen availability and non-burning characteristics) are retained, and yet fertilizers having improved physical and chemical properties are achieved. The superior compositions of this invention result from the novel combination of ingredients and the novel method of production which gives a nitrogenous base fertilizer which may also act as a carrier for other constituents. In general, the compositions comprise improved foamed urea-formaldehyde (urea-formaldehyde is hereinafter referred to as U-F) condensation products. Other constituents which may be included, if desired, are other fertilizers, trace elements, herbicides, growth regulators, insecticides, nematocides, adjuvants, animal repellents, fungicides, insect repellents, seeds and the like.

The present compositions have the distinct advantage of being lightweight and readily and freely distributable. Moreover, foaming of the resinuous condensation material provides a cellular, self-supporting physical structure eliminating the need for the lightweight porous carrier material employed in my prior fertilizer compositions. This permits production of a more homogeneous composition by facilitating intimate incorporation of all constituents during manufacture. With my present improved fertilizers, it is also possible to have a higher nutrient analysis while maintaining the same lightweight characteristics. Further, the present compositions have greater versatility and use since they are capable of encapsulating more constituents and may therefore be not only an effective fertilizer, but also capable of reducing the debilitating effect of weeds, pests or the like on growing vegetation.

The most pertinent prior art of which I am aware is U.S. Patent No. 2,988,441 to Pruitt which describes a soil substitute plant medium comprised of a foamed polymer and a nutrient charged resin of the synthetic ion exchange type. The plant nutrients are stated to be in chemical combination with the water insoluble ion exchange resin, and the final product is asserted to be a stable, synthetic, water insoluble, foamed product which provides a unitary self supporting and relatively permanent plant growing medium capable of being used as a soil substitute. The polymeric materials mentioned by Pruitt are, for example, polyurethanes, rubber and vinyl resins. These materials are said to be capable of combining with the other materials to form a rugged, long life foam capable of withstanding high degrees of physical wear and the attack of chemicals encountered in service as a soil substitute. Therefore, although Pruitt discloses a foamed product capable of sustaining plant growth, his product is not in its essence a fertilizer but rather a plant growth medium.

The present invention is not a soil substitute, but relates to fertilizers used to promote growth of vegetation by supplying the major elements needed for such growth over a period of time. It may also have pesticidal or other properties depending on the constituents incorporated in it. U-F foam is utilized to supply a basic plant nutrient and to act as a carrier for other constituents, releasing them at a desired rate to promote optimum plant growth. It is partially water soluble and thus provides desirable controlled release of the active ingredients.

It is a primary object of this invention to provide novel lightweight granular fertilizer compositions having relatively high nutrient analysis and other desirable characteristics.

Another object of the present invention is to provide novel compositions comprised of a foamed resinous body having a high nitrogen availability index, alone or in combination with other constituents.

Further objects are: to provide a composition which allows the controlled slow release of encapsulated constituents after it is applied to a vegetated area; to provide a novel process for preparing a foamed fertilizer composition in which a U-F solution is foamed and adapted to include other constituents either by intimate mixing with the solution, encapsulation in the foam pores, or both; to provide a novel process for the production of a foamed fertilizer in which a U-F solution is prepared and combined with a foaming agent and foamed to a suitable degree under conditions promoting condensation reaction of the U-F; to provide a composition which is physically stable and, therefore, not subject to excessive mechanical breakdown by normal handling and distribution; and to provide a novel process for making a physically stable fertilizer composition.

Still other objects and advantages will become apparent to those skilled in this art from the appended claims and the following description of the best mode of carrying out this invention, and examples and modifications thereof.

I have discovered that it is possible to produce a cellular, foamed, urea formaldehyde resin by incorporating a foaming agent in a U-F solution, and developing the foam structure while effecting the condensation reaction of the urea and formaldehyde in the solution. Thereafter the product may be dried and crushed for fertilizer use. The foaming is preferably carried out by agitating the U-F while blowing air or other gases such as nitrogen, carbon dioxide, and the like into the vessel in which the foaming is carried out. A gaseous blowing agent is not necesary but simplifies the process of making the foam. Constitutents may also be included in amounts as desired. The resulting U-F condensation product is an excellent source of nitrogen in a slowly soluble and available form, and, for normal preferred use, is a substantial nitrogen supplying ingredient in the fertilizers of this invention. Depending on the type of final product desired, other constituents such as fertilizer materials, pesticides, trace elements, etc., may be added prior to, during, or subsequent to foaming. Specific examples of the constitutents which may be added are listed below in Tables I-X.

In carrying out the process of this invention, a U-F solution is prepared in reaction vessels. The urea may be supplied in solid form or as an alkaline solution of urea and formaldehyde which, on combining, form soluble methylol ureas. U-F solutions are also available commercially and may be readily substituted to form at least part of the urea solution. Likewise, formaldehyde can be used either in gaseous phase, 37% solution, or supplied entirely or in part by commercially available urea formaldehyde solutions. The molar ration of urea to formaldehyde should be maintained in the range of 1:1 to 3:1 for best results. A molar ratio of 1.6:1–2.4:1 is preferred to produce a nitrogen fraction with at least ⅓ insoluble nitrogen having a desirable degree of availability.

When preparing the methylol ureas in a reaction vessel, it is preferable to maintain the aqueous solution alkaline until a preponderance of the urea and formaldehyde is in the form of methylol ureas. During dissolution of the urea and formaldehyde in which the methylol ureas are formed, the primary reaction phase is preferably maintained in the range of 30° C. to 60° C. to facilitate dissolution and speed the reaction. An alkaline pH of 7.0–9.5 is desirable although not essential. For this purpose a caustic solution such as potassium or sodium hydroxide, for example, may be added to the reaction vessel. For a more detailed description of the production of a suitable methylol urea solution, reference is hereby made to my U.S. Patent 3,076,700 cited above.

Addition of a foaming agent to the methylol ureas solution is preferably carried out by mixing in a holding tank, although the addition may be made in a suitable mixing or blending apparatus, or in a foam forming agitator. The amount of foaming agent added to the U-F solution will vary according to the particular agent and quality of foam desired. In general, the foam should be non-collapsing with substantially the same consistency throughout. Vary good foams having a maximum effective cell size of about 2 mm. and containing a large quantity of gas have been produced by using .05 to 7% foaming agent by weight of the dry foam. The range of 0.7–3% foaming agent has been found to be particularly effective with the better foaming agents.

The foaming agent may be virtually any compatible material capable of imparting a foamable character to the U-F solution. However, particularly good results are obtainable by using an emulsifier, detergent, or other surface active or wetting agent, examples of which are listed below. In general, it has been found that nonionic and anionic foaming agents produce better foaming results than do the cationic agents.

| Trade Name | Chemical | Type | Manufacturer |
| --- | --- | --- | --- |
| Aerosol OT-75 | Dioctyl ester of sulfosuccinic acid | Anionic | American Cyanamid Co. |
| Aerosol OT-100 | do | do | Do. |
| Aerosol 18 | Disodium n-octadecylsulfosuccinate | do | Do. |
| Arctic Syntex 036 | Polyoxyethylsted nonylphenol | Nonionic | Colgate Palmolive Co. |
| Duponol WA Dry | Technical lauryl sodium sulfate | Anionic | E. I. du Pont de Nemours and Co. |
| Duponol WA Paste | do | do | Do. |
| Emcol HA | Complex sulfonate | do | Witco Chem., Co., Inc. |
| Emcol P-10-49 | Alkanolamine salt of an alkyl aryl sulfonate | do | Do. |
| Emcol P. 10-59 | Amine salt of dodecyl benzene sulfonic acid | do | Do. |
| Mentor Liquid 35 | Alkyl aryl sulfonate | do | Colgate Palmolive Co. |
| Mentor Beads | do | do | Do. |
| Polytergent G-300 | Octylphenoxy polyethoxyethanol | Nonionic | Olin Mathieson Chem., Co. |
| Solar 40 | Alkyl aryl sulfonates | Anionic | Swift & Co. |
| Solar 90 | do | do | Do. |
| Solar 25 liquid | Coconut oil fatty acids amine condensate modified. | do | Do. |
| Solar agricultural Emulsifier 101 | Blend of polyoxyethylene ethers with a sulfonate. | do | Do. |
| Sapamine KWC | Quaternary ammonium compound | Cationic | Ciba Co., Inc. |
| Victamine C | Substituted amide of alkyl phosphate $$RNH-\underset{\underset{OR'}{\|}}{\overset{\overset{O}{\|}}{P}}-ONHR$$ $R=C_{12}H_{25}$ $R'=$Water solubilizing group | do | Victor Chemicals (Division Stauffer Chem. Co.) |
| Victamine D | Same as above except— $R=C_{18}H_{37}$ | do | Do. |
| Wettex 40X | Special alkyl aryl agent | Anionic | Essential Chem. Co. |
| Acidol 25A | Alkyl dimethyl amine acetate | Cationic | Onyx Chem. Corp. |
| Aprill Wetting Agent | Sodium alkyl aryl sulfonate | Anionic | Essential Chem. Co. |
| Emcol H-31A | Polyethylene glycol 400 oleate | Nonionic | Witco Chemical Co. |
| Onyx BTC 50% | Alkyl dimethylbenzyl ammonium chloride | Cationic | Onyx Chem. Corp. |
| Polytergent B-200 | Nonylphenoxy polyethoxyethanol | Nonionic | Olin Mathieson Chem. Co. |
| Sul-F'on-Ate-AAT | Triethanolamino neutralized salt of dodecyl benzene sulfonic acid. | Anionic | Tennessee Corp. |
| Sulframine AB-40 | Dodecyl benzene sodium sulfonate | do | Ultra Chem. Inc. |
| Sulframine | Alkylnaphthalene sodium sulfonate | do | Do. |
| Toximul R | Sulfonate nonionic blend | Nonionic | Stepan Chem. Co. |
| Toximul S | do | do | Do. |
| Triton X-100 | Isooctyl phenyl polyethoxyethanol | do | Rohm & Haas Co. |
| Aerosol MA-80 | Dihexyl ester of sodium sulfosuccinic acid | Anionic | American Cyanamid Co. |
| Aerosol OT-B | Dioctyl ester of sodium sulfosuccinic acid | do | Do. |
| Aerosol OS | Sodium isopropylnaphtalene sulfonate | do | Do. |

| Trade Name | Chemical | Type | Manufacturer |
| --- | --- | --- | --- |
| Alkaterge A | Substituted oxazolines homologous series to Alkaterge C. | Cationic | Commercial Solvents Co. |
| Alkaterge C | A substituted oxazoline | do | Do. |
| Alkaterge E | Substituted oxazolines homologous series to Alkaterge C. | do | Do. |
| Alkaterge T | Substituted oxazoline homologous to Alkaterge C. | do | Do. |
| Emcol E-607 | N (lauroyl colamino formylmethyl) pyridinium chloride. | do | Witco Chem. Co., Inc. |
| Emcol 4150 | Complex fatty acid derivative of aliphatic sulfonate. | Anionic | Do. |
| Emcol 5100 | Alkanolamine fatty acid condensate | Nonionic | Do. |
| Intracol OA | Long chain fatty acid amine containing multiple amine groups. | Cationic | Synthetic Chem., Inc. |
| Intracol R | do | do | Do. |
| Leyco 224 | Triethanolamine alkyl aryl sulfonate | Anionic | Leyda Oil & Chem., Co. |
| Nalquat G-8-11 | Quaternary ammoniums derived from the "Nalcamines." | Cationic | Nalco Chem. Co. |
| NASE Powder | Sodium alkyl napthalene sulfonate | Anionic | Onyx Chem. Corp. |
| Nopcogen 14-L | Lauric alkylolamine condensate | Cationic | Nopco Chemical Co. |
| Polytergent B-300 | Nonylphenoxy polyethoxyethanol | Nonionic | Olin Mathieson Chem. Co. |
| Polytergent J-200 | Polyethoxyethyl aliphatic ether | do | Do. |
| Polytergent J-300 | do | do | Do. |
| Polytergent J-400 | do | do | Do. |
| Polytergent J-500 | do | do | Do. |
| Sulframin WF | Modified sodium naphthalene sulfonate | Anionic | Atlantic Refining Co. |
| Victawet 58B | Phosphorated higher alcohol (Capryl)$_5$ Na$_5$ (P$_3$O$_{10}$)$_2$. | do | Victor Chemicals (Division Stauffer Chem. Co.) |

For a more complete description of suitable foaming agents, and further examples, reference is hereby made to "Detergents & Emulsifiers up to date 1962," by John W. McCutcheon Inc., 236 Mt. Kemble Avenue, Morristown, New Jersey.

The resinous foamable U-F solution is foamed in a suitable foaming apparatus, preferably a jacketed kettle provided with an agitator. In such an apparatus best foaming results are obtained by operating the beater at about 900–3500 r.p.m. Gas may be introduced into the bottom of the mixer during foam production. The gas is not essential, however; and, when used, the rate of introduction is not critical since excess gas will be expelled by the bursting of larger foam bubbles on the surface of the U-F solution.

The final pH of the fertizler composition should be in the order of 3.5 to 6.5 if an optimum rate of nitrogen availability for plant assimilation is to be achieved. It has therefore been found that the pH of the U-F solution should be acidic during conversion by condensation reaction into methylene ureas. This is preferably accomplished by adjusting the U-F solution pH to 3.0 to 5.5 in the foaming phase where, in the preferred embodiment of this invention, condensation is initiated. It is not critical when the U-F solution is adjusted, except that it should be acidic during condensation to the insoluble methylene ureas state. Accordingly, the pH adjustment may be made shortly prior to or during foaming, by introduction into the U-F solution of any suitable pH regulating material. The most economical and effective method of pH adjustment is by use of water soluble acids or acidic fertilizer solids which, in addition to regulating pH, may have a salutary fertilizing effect in the final product. Suitable acids are mineral acids such as: sulfuric, nitric, phosphoric, hydrochloric, hydrobromic, hydrofluoric, perchloric, sulfurous, nitrous, phosphorous, hypochlorous, hydriodic, persulfuric, arsenic, arsenous, boric, carbonic, selenic, and the like.

Water soluble organic acids such as the saturated aliphatics, aromatic, β-unsaturated, sulfonics, and the like may also be used. Examples of such organic acids are: formic, acetic, propionic, n-butyric, isobutyric, n-valeric, sulfonbenzoic monochloracetic, dichloroacetic, oxalic, malonic, succinic, acrylic, maleic, propionic, methyl sulfonic, benzene sulfonic, and the like.

Still other acids suitable for pH adjustment of the U-F solution, which has a desirable pesticidal effect in the final composition, are: trichloroacetic acid, dalapon, methyl arsonic acid, cacodylic acid, 2,4-dichlorophenoxyacetic acid, phenyl mercuric acetate, and the like. The amount required for pH adjustment is not necessarily equivalent to the amount required for the desired pesticidal effect.

The acid concentration required to achieve the desired pH may vary considerably depending on the acid, U-F ratio, solution temperature and solution time in the foaming apparatus, all of which control the bulk density and physical stability of the foam. However, the amount sufficient for regulating the pH to the range of 3.0 to 5.5 may be readily determined by means well known in this art. For best results the temperature of the solution being foamed should be maintained at about 50 to 200° F., 130 to 180° F. being preferable, to catalyze the reaction between urea and formaldehyde. This reduces acid requirements and produces a desirably higher pH. Moreover, with the high temperature, substantial quantities of moisture will be driven off, thereby decreasing the amount of subsequent wet foam drying necessary.

For mass production, it is desirable to select a mixer capable of receiving foamable U-F solution at one end and discharging foam at the other. Upon discharge from the mixer the wet foam is dried, crushed, screened and classified. The preferred drying operation is comprised of a first drying phase where the foam is dried to 15 to 25% moisture (by using radiant heaters this may be accomplished in approximately 2 to 10 minutes) and a second phase in which any suitable heating elements may be used to dry the foam to about 0.5 to 15% moisture. While the foregoing is the preferred method of drying, any convenient means of drying may be employed.

At this point the fertilizer is ready for immediate shipment or turf application.

However, in the preferred embodiment of this invention, the material is passed through a second phase of processing to improve the quality of the product. The sized dry foam is carried to a second mixer unit where it is mixed with a foam stabilizing agent. Any material which imparts physical stability to the dry foam may be used. A suitable stabilizing agent is methylol ureas solution (substantially the same as the original U-F solution described above) either alone or in combination with water. Another typical stabilizing agent is Daran, a water soluble resinous polyvinylidene chloride latex emulsion produced by the W. R. Grace Co.

The amount of liquid added in the second mixer should be approximately 20 to 100% of the weight of dry material depending on the physical stability, agglomeration and bulk density desired. The liquid serves to physically stabilize the foam, making it less fragile; and the U-F solution (when used) increases the plant nutrient content of the dry foam. The mixing in this phase may be carried out at elevated temperatures to catalyze condensation of the methylol ureas in the sprayed U-F solution although this is not necessary since this may be conveniently accomplished in a second drying phase which follows the second mixing. Acid may be added in the second processing phase to promote the urea-formaldehyde condensation reaction but this is not always necessary as the foam itself is acidic. Other constituents such as pesticides, fertilizers, etc., may also be added and agglomerated with the foam during the second mixing. The same constituents which may be incorporated in the U-F solution as described earlier may in addition or instead be incorporated into the composition at this stage of processing by addition in the mixing vessel. In any case the constituents should be incorporated in the composition in an amount sufficient to bring about the desired end for which it is intended. The amounts and particular materials which will bring about different end results are well known and are not part of this invention.

The mixture exiting from the second mixing phase is fed into a dryer unit preferably operating at approximately 30° C. to 135° C. The material is dried to 0.5–6% moisture and on exit from the dryer passes through a screen, plus eight mesh material preferably bieng returned to the mill for grinding and the remainder conveyed to a packaging unit. After the second drying and crushing, the foamed product is ready for immediate use without curing, ageing or weathering.

Example I is the preferred mode of carrying out this invention:

Example I

Step 1.—170.6 grams of urea were mixed with 91.6 grams of urea-formaldehyde concentrate (59% formaldehyde, 26% urea, 15% water by weight) and 33.6 ml. of water in an agitated vessel at 54° C. The mole ratio of urea-formaldehyde was 1.8/1.0. The pH after solution was 7.3.

Step 2.—3.0 grams of Sulfonate AAT were added (per 200 cubic centimeters of solution). The resulting solution was then foamed in a foaming apparatus using a high speed agitator. The foam so formed was collected, dried at 70° C., crushed and classified.

Step 3.—121 grams of the foam composition made as in Step 2 were impregnated with 36.3 ml. of water in a blender. To this was added 84.6 ml. of a solution having the composition indicated in Step 1. After blending ten minutes the resulting composition was dried at 85° C., crushed and classified. The resulting product was a slow release, non-burning, granular, lightweight foam composition having high nitrogen content and availability. The chemical and physical characteristics of this composition are:

Bulk density _____#/ft.$^3$__ 18.6
U.S. Standard Sieve analysis:
  +8 _____ 4.5
  −8 +10 _____ 22.3
  −10 +20 _____ 56.0
  −20 +40 _____ 9.8
  −40 +70 _____ 4.5
  −70 +100 _____ 1.3
  −100 _____ 1.6

Chemical analysis:
  Total nitrogen _____percent__ 40.0
  Cold water insoluble nitrogen _____do____ 15.7
  Nitrogen availability index [1] _____ 60.4
  pH _____ 4.2
  Moisture _____percent__ 0.8

[1] Ref: 2.37, 2.38, AOAC, 8th Edition 1955.

Example II

Step 1.—1140.9 grams urea, 612.0 grams of urea-formaldehyde concentrate and 224.0 grams of water were mixed together in an agitated vessel at 60° C. After solution was complete the pH was adjusted to 8.5 by the addition of 2 N sodium hydroxide. To a 100 ml. aliquot of the solution, 2 grams of sulfonate AAT and 1¼ ml. of 28% phosphoric acid were added. The resulting mixture was immediately foamed using a double bladed aerating agitator. The resulting foam was collected, dried, crushed and classified.

Step 2.—570.44 grams of urea, 306.0 grams of urea-formaldehyde concentrate and 112.0 grams water were mixed together in an agitated vessel at 60° C. The pH of the solution was rendered alkaline by the addition of 10 ml. of N/10 sodium hydroxide. The solution was held for use in Step 3.

Step 3.—225 grams of the foam made in Step 1 was stabilized by the impregnation of 162 ml. of water. The resulting material was mixed with 19.8 grams potash and 54.3 grams of potassium metaphosphate and impregnated with 135 ml. of the solution made in Step 2. The resulting product was dried, crushed and classified. This comprised a complete granular, free flowing, substantially dust free N-P-K fertilizer product.

Example III 158.3 grams of urea, 76.5 grams of urea-formaldehyde concentrate and 30 ml. of water were mixed together in an agitated vessel at 55° C. for 30 minutes. While vigorously agitating the solution, 160 grams of ammoniated triple superphosphate having a pH of 4.6 and 29.4 grams of potash were added. Four grams of sulfonate AAT were then added to the composition. After acidification with 28% phosphoric acid, the solution was immediately foamed in a foaming vessel using an aerating agitator. The foam was collected, dried at 75° C., crushed and screened. The resulting product comprised a complete N-P-K fertilizer product having controlled release properties.

Example IV

Step 1.—895.0 grams urea, 480 grams urea-formaldehyde concentrate and 175.4 grams of water were mixed in an agitated vessel at 55° C.

Step 2.—24.33 grams of sulfonate AAT and 17.72 grams of 95% phenyl mercuric acetate were added to the solution made in Step 1. The resulting mixture was acidified by the addition of 28% phosphoric acid and immediately foamed with an aerating agitator. The foam was collected, dried, crushed and classified.

Step 3.—100 grams of the foam formed in Step 2 was impregnated with 73.8 ml. of solution having the same composition as that used in Step 1. 5.75 ml. of 28% phosphoric acid was added to the above mix and the final composition blended, dried, crushed and classified. The final product comprised a free flowing, substantially dust free combination fertilizer fungicide having controlled release properties.

As shown in the fully described examples above, the process of this invention comprises a foaming step and, in some cases, an additional stabilizing step. The product of the foaming step is dried and sized to give a granular foamed product prior to stabilizing. After stabilization, the product formed is again dried and reduced to a granular form.

The examples shown in Table A below were formulated in a manner similar to Examples 1–4. Various surfactants identified in the table were used to make the resin foamable.

TABLE A

| Composition Number | Feed rates, gms. feed/200 gms. product | | | | | |
|---|---|---|---|---|---|---|
| | 1 | 2 | 3 | 4 | 5 | 6 |
| Materials: | | | | | | |
| A. Foaming step— | | | | | | |
| Urea | 85.3 | 85.3 | 85.3 | 85.3 | 85.3 | 124.1 |
| Urea-formaldehyde concentrate | 45.8 | 45.8 | 45.8 | 45.8 | 45.8 | 66.7 |
| Water | 16.8 | 16.8 | 16.8 | 16.8 | 16.8 | 23.0 |
| Sodium hydroxide 2 N | 0.2 | 0.2 | 0.2 | 0.2 | 0.2 | |
| Sulfuric acid 15% | 1.3 | 1.3 | 1.3 | 1.3 | 1.3 | 2.2 |
| Ultrawet K dense | 1.5 | | | | | 2.5 |
| Sulfonate AAT | | 1.5 | | | | |
| Polytergent | | | 1.5 | | | |
| Aerosol OT-75 | | | | 1.5 | | |
| Triton X-100 | | | | | 1.5 | |
| B. Stabilizing step— | | | | | | |
| Water | 36 | 36 | 36 | 36 | 36 | |
| U-F Resin [1] | 83 | 83 | 83 | 83 | 83 | |
| Daran [2] | | | | | | 31.4 |
| Product | 200 | 200 | 200 | 200 | 200 | 200 |

[1] This U-F resin is substantially the same as that described in Example I Step 1.
[2] A polyvinylidene chloride latex emulsion manufactured by W. R. Grace & Co.

The examples shown in Table B below were formulated in a manner similar to Examples 1–4. Various constituents were incorporated to make a variety of fertilizer-constituent compositions. Constituents were added to the solution prior to foaming, in the stabilizing step and in both of the foregoing steps. This demonstrates the various means in which constituents may be incorporated in the foamed product. As was the case in the working examples, the foamed material was dried and sized prior to and after the stabilizing step.

The foregoing specific examples demonstrate how these constituents are to be incorporated in the compositions and indicate the amounts desired for specific compositions. The amount will, of course, be sufficient to enable the constituent to perform its intended function. These amounts are known in the herbicide, insecticide, fertilizer, etc., fields.

In the primary process phase, the constituents may be added to the U-F solution either before or during foaming. In the secondary process phase, they may be added to the dry foam stock made in the first process phase.

Below are examples of constituents which may be incorporated in this composition as outlined above.

TABLE I.—FERTILIZERS

Ammonia
Ammonium phosphate
Ammonium sulfate
Diammonium phosphate
Ammonium nitrate
Sodium nitrate
Ammonium metaphosphate
Calcium nitrate
Potassium nitrate
Ammonium chloride
Phosphate rock
Basic slag
Trisodiumphosphate
Superphosphate
Orthophosphoric acid Calcium phosphate
Phosphoric acid
Dicalcium phosphate
Calcium magnesium phosphate
Tricalcium phosphate
Calcium metaphosphate
Potassium metaphosphate
Potassium hydrogen phosphate
Potassium chloride
Potassium sulfate
Sulfate of potash magnesia
Potassium carbonate
Urea

TABLE B

| Composition Number | Feed rates, gms. feed/200 gms. stabilizer product | | | | | | | | | | |
|---|---|---|---|---|---|---|---|---|---|---|---|
| | 1 | 2 | 3 | 4 | 5 | 6 | 7 | 8 | 9 | 10 | 11 |
| Materials: | | | | | | | | | | | |
| A. Foaming step— | | | | | | | | | | | |
| Aerosol OT 75% [1] | 1.1 | 2.0 | 1.0 | 0.9 | 1.0 | 1.0 | 1.0 | 2.0 | 2.0 | | |
| U-F Resin [2] | 116 | 102 | 119 | 102 | 110 | 110 | 113 | 103 | 103 | 112.2 | 146.8 |
| Sevin 50% | 9.2 | .16 | | | | | | | | | |
| Phosphoric acid 28% | 1.8 | 2.1 | 1.7 | 1.3 | 2.2 | 2.2 | 0.8 | | | | |
| Atrazine 80% | | | 4.8 | 17.0 | | | | | | | |
| Neburon 50% | | | | | 11.9 | 11.9 | | | | | |
| PMA 95% [3] | | | | | | | 1.2 | | | | |
| Thiram 99% | | | | | | | 8.1 | | | | |
| Tech DDT 100% | | | | | | | | 16.4 | 16.4 | | |
| Nitric acid 10% | | | | | | | | 1.7 | 1.7 | | |
| Sulfonate AAT 50% | | | | | | | | | | 1.9 | 3.7 |
| 24D acid 40% in methanol | | | | | | | | | | 2.3 | |
| B. Stabilizing step— | | | | | | | | | | | |
| Dry foam | 100 | 98 | 100 | 92 | 100 | 92 | 100 | 100 | 92 | 100 | 118 |
| U-F Resin [2] | 126 | 114 | 126 | 116 | 116 | 116 | 124 | 126 | 115 | 125 | 89 |
| Phosphoric acid 5% | 15 | 18 | 10 | 6 | 17 | 14 | 15 | | | | |
| Sevin 50% | | 16 | | | | | | | | | |
| Atrazine 80% | | | | 16.4 | | | | | | | |
| Neburon 50% | | | | | 2.8 | 16.2 | | | | | |
| PMA 95% | | | | | | | 0.36 | | | | |
| Thiram 99% | | | | | | | 2.4 | | | | |
| Nitric acid 2% | | | | | | | | 18.4 | 16.8 | | |
| Tech DDT 100% | | | | | | | | | 19.0 | | |
| 24D acid 100% | | | | | | | | | | 2.2 | |
| Alkanolamine salt of 24D acid 39% | | | | | | | | | | | 11 |
| Weight of Product | 200 | 200 | 200 | 200 | 200 | 200 | 200 | 200 | 200 | 200 | 200 |

[1] Percent of active material by weight.
[2] This U-F resin is substantially the same as that described in Example I, Step 1.
[3] PMA is phenyl mercuric acetate.

Tables I–X below list a few of the better constituents which may be added to the fertilizer compositions of this invention to make them multifunctional. For example, application of a fertilizer-fungicide combination to a fungus infected plant will both control the fungus and fertilize the plant, thus carrying out a dual function.

The individual constituents vary in potency and activity in carrying out the function for which they are selected, as is well known. The amounts utilized in the compositions of this invention will therefore vary accordingly.

TABLE II.—HERBICIDES 2 4–D
4–CPA
2–(3,4–DP)
4–(245–TB)
2,4,5–TES
Dalapon
CDEA
Barban
Monuron 2,4,5–T
2–(MCPP)
4–(2,4–DB)
4–(4–CPB)
2,4–DEB
DCV
CIPC
Fenuron
Diuron TABLE II.—HERBICIDES—Continued

| | |
|---|---|
| PCP | DNAP |
| 2,3,6-TBA | NPA |
| PMA | HCA |
| MH | DCB |
| Amitrole-T | EXD |
| Erbon | CEPC |
| EPTC | DIPA |
| CBMM | CBDM |
| BMM | AMS |
| SMDC | Amiben |
| Simazine | Ipazine |
| Propazine | Semetone |
| Aratone | Acrolein |
| Banvel D | Dipropalin |
| Calcium cyanamid | Diphenylacetonitrile |
| 3,4 doichloropropion-anilide | Zytron |
| | Cacodylic acid |
| MCPA | 3,4-DA |
| 2-(2,4-DP) | Silvex |
| 2-(4-CPP) | 4-(MCPB) |
| 2-(3,4-DB) | Sesone |
| MCPES | TCA |
| 2,2,3-TPA | CDAA |
| IPC | BCPC |
| CDEC | Fenuron TCA |
| Monuron TCA | Neburon |
| DNBP | DNC |
| 2,3,5,6-TBA | Endothall |
| KOCN | IPX |
| TCB | Amitrole |
| OCH | MAA |
| PBA | CPPC |
| EBEP | DMA |
| CBFM | CBM |
| BDM | Dichlone |
| DMTT | Fenac |
| Atrazine | Trietazine |
| Chlorazine | Prometone |
| Diquat | 2,4-DEP |
| Trifluralin | Betazan |
| Bandane | p-dichlorobenzene |
| Dacthal | Lorox |
| Chlordane | |

TABLE III.—FUNGICIDES

| | |
|---|---|
| Captan | Copper oleate |
| Copper | 1,1-Bis(p-chlorophenyl) 2,2,2-trichloroethanol |
| Sulfur | |
| Ferbam | Mylone |
| Karathane | Phaltan |
| Maneb | Thiram |
| EMMI | Phenylmercuric acetate |
| PHIMM | Zineb |
| Dyrene | Ziram |
| Terrachlor | 1,2,4 trichloro-3-5-dinitro benzene |
| Dithane M-45 | |

TABLE IV.—GROWTH REGULATORS

Gibberellin and related compounds
$N^6$-Benzylaminopurine compounds
Maleic hydrazide
Colchicine
2 - isopropyl - 4 - dimethylamino - 5 - methylphenyl - 1-piperidinecarboxylate methyl chloride and related compounds
2,4-dichlorobenzyltributylphosphonium chloride
(2-chloroethyl) trimethylammonium chloride and related compounds
2,3-dichloroisobutyric acid
6-furfurylaminopurine (Kinetin) and related compounds
2-pyridinethiol, 1-oxide
2,3,6-trichlorobenzoic acid
2,6-dichlorobenzoic acid
Indole-3-acetic acid
Indole-3-butyric acid
Alpa-naphthaleneacetic acid and related compounds
Adenine
N-m-tolylphthalamic acid (Duraset)
2,3,5-triiodobenzoic acid
Benzthiozole-2-oxyacetic acid
B-hydroxyethyl-hydrazine
Indole-3-alanine
Isochlorotetracycline and related compounds
Succinamic acid

TABLE V.—INSECTICIDES AND NEMATOCIDES

| | |
|---|---|
| Allethrin | Kelthane |
| DDT | Ethion |
| Methoxychlor | TEPP |
| Chlordane | Rotenone |
| Aramite | Endrin |
| Lindane | Heptachlor |
| Calcium arsenate | BHC |
| Copper sulfate | Toxaphene |
| Pyrethrum | Sevin |
| Malathion | OW-9-acaricide pyrene 1330 |
| Parathion | |
| Chlorobenzilate | Ovotran |
| Dieldrin | Tedion |
| Aldrin | |

TABLE VI.—ANIMAL REPELLENTS

| | |
|---|---|
| Allyl isothiocyanate | Tobacco |
| Paradichlorobenzene | Orthodichlorobenzene |
| Cresylic acids | Piperonyl butoxide |
| Bone oil | Thiram |

TABLE VII.—SOIL STERILANTS

| | |
|---|---|
| Carbon tetrachloride | Methyl bromide |
| Ethylene dibromide | Mylone |
| Calcium cyamide | Nemagon |
| Carbon disulfide | Orthodichlorobenzene |
| Paradichlorobenzene | Sodium methyl dithio-carbamate |
| Ethylene dichloride | |
| Chloropicrin | |

TABLE VIII.—INSECT REPELLENTS

| | |
|---|---|
| Benzol | N,N-diethyl meta toluamide |
| Diphenylamine | |
| Benzyl benzoate | Diethyl phthalate |
| Butoxypolypropylene glycol | Di-n-propyl isocinchomeronate |
| Dibutyl phthalate | Lindane |
| Di-n-butyl succinate | |

TABLE IX.—ADJUVANTS

| | |
|---|---|
| Dyes | Diluents |
| Sticking agents | Conditioning agents |
| Spreaders | Chelates |
| Surfactants | Chelating agents |

TABLE X.—TRACE ELEMENTS

| | |
|---|---|
| Iron | Copper |
| Manganese | Zinc |
| Boron | Iodine |
| Molybdenum | Calcium |
| Magnesium | Sulfur |

Table VII shows the required element but not necessarily the chemical compound which is added. The above trace elements may for example, be added as salts or chelates or in their elemental form.

Several references which identify the commonly used names in Tables I–X are:

(1) Pesticide Chemicals Official Compendium, Association of American Pesticide Control Officials, Inc., 1962 edition.

(2) Frear, D. E. H., Pesticide Index, 1961 edition, College Science Publishers, State College, Pa.

(3) Pesticide Research Institute, Guide to the Chemicals Used in Crop Protection, April 1961, Research Branch, Canada Department of Agriculture.

(4) Terminology Committee Weed Society of America, Weeds 8, No. 3, July 1960. Identification of designations used in Table II for Herbicides.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The process of making a granular, non-burning fertilizer composition, comprising the steps of:
    (a) preparing a urea-formaldehyde solution having a molar ratio of urea to formaldehyde in the range of 1:1–3:1 and a pH of approximately 7.0–9.5;
    (b) incorporating sufficient foaming agent in said urea-formaldehyde solution to make the proportion of foaming agent in said composition from 0.05–7.0%, said foaming agent being a surfactant capable of producing a cellular structure and being incorporated prior to the foaming of said solution;
    (c) adjusting the pH of the urea-formaldehyde solution to 3.0–5.5 by adding an acidic material to said solution to promote the condensation reaction of the urea and formaldehyde;
    (d) agitating said solution to cause it to foam; and
    (e) drying the foamed product of the condensation reaction at a sufficient temperature and for a sufficient time to make the foamed product capable of being reduced to granular form and reducing it to a granular form in which the majority of the granules are sufficiently small to pass through an eight mesh standard sieve.

2. The process as defined in claim 1, wherein the proportion of foaming agent is in the range of 0.7–3% by weight of the dry foam.

3. The process as defined in claim 1, wherein the urea-formaldehyde solution is maintained at a temperature of 50–200° F. during the foaming thereof.

4. The process as defined in claim 1, wherein said foamed product is dried in two steps, its moisture content being reduced to 15–25% in the first step and from 0.5–15% in the second step.

5. The process as defined in claim 1, wherein said solution is acidified with a material selected from the group consisting of: sulfuric, nitric, phosphoric, hydrochloric, hydrobromic, hydrofluoric, perchloric, sulfurous, nitrous, phosphorous, hypochlorous, hydriodic, persulfuric, arsenic, arsenous, boric, carbonic, selenic, formic, acetic, propionic, n-butyric, isobutyric, n-valeric, sulfobenzoic, monochloroacetic, dichloroacetic, oxalic, malonic, succinic, acrylic, maleic, propionic, methyl sulfonic, benzene sulfonic, trichloroacetic, methyl arsonic, cacodylic, and 2,4-dichlorophenoxyacetic acids.

6. The process as defined in claim 1, together with the step of incorporating a pesticide into the composition.

7. The process as defined in claim 1, together with the step of incorporating at least one constituent selected from the group consisting of plant nutrients and plant growth regulators into said composition.

8. The process of making a granular, non-burning fertilizer composition comprising:
    (a) preparing a urea-formaldehyde solution having a molar ratio of urea to formaldehyde in the range of 1:1–3:1 and a pH of approximately 7.0–9.5;
    (b) incorporating sufficient foaming agent in said urea-formaldehyde solution to make the proportion of foaming agent in said composition from 0.05–7.0%, said foaming agent being incorporated prior to the foaming of said solution;
    (c) adjusting the pH of said solution to from about 3.0 to about 5.5 by adding an acidic material to said solution to promote the condensation reaction of the urea and formaldehyde;
    (d) agitating said solution to produce foaming during the condensation reaction;
    (e) drying the foamed product of the condensation reaction at a sufficient temperature and for a sufficient time to reduce its moisture content to 15–25%;
    (f) reducing the dried product to granular form;
    (g) treating the granular foamed product with a stabilizing agent selected from the group consisting of water, urea-formaldehyde solutions and polyvinylidene chloride latex emulsions to reduce the fragility of said foam; and
    (h) drying the stabilized product at sufficient temperature and for a sufficient time to produce a moisture content of from 0.5–15% and reducing it to a granular form in which the majority of the granules are sufficiently small to pass through an eight mesh standard sieve.

9. The process as defined in claim 8, wherein the amount of stabilizing agent added is in the range of 20–100% by weight of the dried foamed product.

10. A fertilizer composition produced by the process defined in claim 1.

References Cited by the Examiner

UNITED STATES PATENTS

| | | | |
|---|---|---|---|
| 2,076,295 | 4/1937 | Curs et al. | |
| 2,476,065 | 7/1949 | Robinson. | |
| 2,848,840 | 8/1958 | O'Brien et al. | 71—1 |
| 2,988,441 | 6/1961 | Pruitt | 71—1 |
| 3,063,952 | 11/1962 | Vieli. | |
| 3,076,700 | 2/1963 | Renner | 71—64 |

DONALL H. SYLVESTER, *Primary Examiner.*

ANTHONY SCIAMANNA, *Examiner.*